United States Patent [19]
Thompson et al.

[11] Patent Number: 5,326,171
[45] Date of Patent: * Jul. 5, 1994

[54] PYROMETER APPARATUS AND METHOD

[75] Inventors: Thomas E. Thompson, Los Altos; Eugene R. Westerberg, Palo Alto, both of Calif.

[73] Assignee: A G Processing Technologies, Inc., Sunnyvale, Calif.

[*] Notice: The portion of the term of this patent subsequent to Feb. 23, 2010 has been disclaimed.

[21] Appl. No.: 19,743

[22] Filed: Feb. 19, 1993

Related U.S. Application Data

[60] Continuation of Ser. No. 756,536, Sep. 9, 1991, Pat. No. 5,188,458, which is a division of Ser. No. 652,459, Feb. 7, 1991, Pat. No. 5,061,084, which is a continuation of Ser. No. 186,556, Apr. 27, 1988, abandoned.

[51] Int. Cl.$^5$ ................................................ G01J 5/06
[52] U.S. Cl. .................................... 374/121; 374/127; 374/128; 374/133; 250/338.1; 250/505.1
[58] Field of Search .................... 250/338.1, 505.1; 374/121, 123, 126, 127, 128, 133; 356/45

[56] References Cited

U.S. PATENT DOCUMENTS

| | | | |
|---|---|---|---|
| 4,144,758 | 3/1979 | Roney | 374/126 |
| 4,854,727 | 8/1989 | Pecot et al. | 374/121 |
| 4,919,542 | 4/1990 | Nulman et al. | 374/133 |
| 4,979,134 | 12/1990 | Arima et al. | 374/126 |
| 4,989,991 | 2/1991 | Pecot et al. | 374/133 |
| 5,061,084 | 10/1991 | Thompson et al. | 374/127 |
| 5,098,198 | 3/1992 | Nulman et al. | 374/126 |
| 5,114,242 | 5/1992 | Gat et al. | 374/128 |

FOREIGN PATENT DOCUMENTS

| | | | |
|---|---|---|---|
| 0131523 | 8/1983 | Japan | 374/126 |
| 0167929 | 10/1983 | Japan | 374/126 |
| 0171643 | 10/1983 | Japan | 374/126 |
| 0253939 | 12/1985 | Japan | 374/133 |
| 0130834 | 6/1986 | Japan | 374/133 |
| 2082767 | 3/1982 | United Kingdom | 374/128 |

Primary Examiner—William A. Cuchlinski, Jr.
Assistant Examiner—Diego F. F. Gutierrez

[57] ABSTRACT

A method for sensing the temperature of a remote object within a chamber that is heated from outside the chamber, includes sensing radiation from the object within the chamber through a window in the wall of the chamber that exhibits different transmissivity than the wall of the chamber to radiation in a selected waveband relative to the waveband of the radiation supplied through the wall of the chamber to heat the object within the chamber.

2 Claims, 5 Drawing Sheets

SPECTRAL RADIANCE AT 4.5μm FROM SILICON AND QUARTZ

UNITS: WATTS/μm/cm$^2$/STERADIAN

RADIATION FLUXES INCIDENT ON WAFER PYROMETER FROM
(1) SILICON WAFER
(2) QUARTZ ISOLATION TUBE
(3) QUARTZ WINDOW

PYROMETER APPARATUS AND METHOD

RELATED APPLICATION

This is a continuation of application Ser. No. 07/756,536 field on Sep. 9, 1991, now issued as U.S. Pat. No. 5,188,45, which is a divisional application of application Ser. No. 07/652,459 field Feb. 7, 1991, now issued as U.S. Pat. No. 5,061,084, which is a continuation of the parent application Ser. No. 07/186,556 filed on Apr. 27, 1988, now abandoned.

BACKGROUND OF THE INVENTION

Radiation thermometry is a technique which allows the measurement of the temperature of a remote object by analyzing the radiation emitted by the object. All objects at temperatures greater than 0 kelvin emit radiation which can be measured to determine the temperature of the object. The concept of radiation thermometry is based upon the underlying principles that as an object which has a certain emissivity heats up, it emits radiation that shifts in wavelength and increases in intensity such that an object which radiates with an orange glow is hotter than an otherwise identical object which radiates with a red glow. Details of radiation thermometry are discussed in the literature (See, for example, Tenney; *Mechanical Engineering*, Oct. '86; "Red Hot . . . AND HOTTER", pp. 36–41.)

In the case of an object inside a furnace or other environment of elevated ambient temperature, it is not easy to optically detect the radiation from the object alone. Radiation from hot elements present in the environment will be reflected to some degree by the object being detected. Thus, where the object is reflecting significant amounts of unabsorbed radiation, simple optical detection apparatus will indicate a temperature which is higher than the true temperature of the object alone.

SUMMARY OF THE INVENTION

In accordance with the present invention, dual pyrometer detectors and method measure the temperature of a remote heated object such as semiconductor wafer in the presence of ambient radiation within a processing chamber. More specifically, the present invention uses a contactless method to accurately determines the temperature of a remote object within the surrounding environment which includes ambient radiation from a heating source and a hot quartz isolation tube that surrounds the remote object. For example, when quickly heating an object in a furnace, the true temperature of the object may be substantially lower than the surrounding temperature inside the furnace. This problem is further complicated when a hot quartz isolation barrier is positioned around the object, and is further complicated when the temperature of the object is below 700° C.

In accordance with the illustrated embodiment of the present invention, one detector measures emitted radiation from both the remote object and from the environment, and the other detector measures radiation substantially only from the environment. The appropriate difference between the outputs of these two detectors yields the detected radiation from the remote object alone and thus final signal can then be used to determine the temperature of the remote object.

DESCRIPTION OF PREFERRED EMBODIMENT

Figure 1:
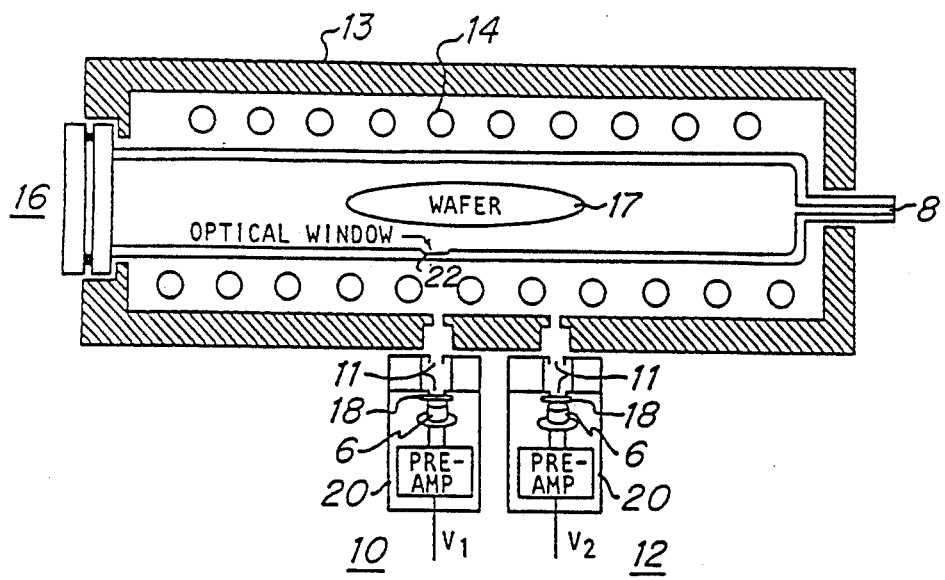
FIG. 1 is a pictorial section view of one implementation of the preferred embodiment of the invention.

Referring now to FIG. 1, the illustrated preferred embodiment of the present invention includes two pyrometer assemblies 10 and 12 positioned near the furnace chamber 13. The furnace chamber 13 is gold-plated internally to reflect the radiation of the tungsten-halogen lamps 14 which are arranged as the heating elements for the semiconductor wafer 17. The wafer 17 is isolated from the atmospheric environment by an isolation tube 15, which may be formed in whole or in part from radiation-transmissive materials such as quartz or sapphire.

Typically, the isolation tube 15 is formed of quartz about 3 mm thick. The wafer 17 is supported within the isolation tube 15 by pins (not shown) that may also be formed of such radiation-transmissive materials. The lamps 14 are positioned between the interior of the furnace chamber 13 and the isolation tube 15. At one end of the isolation tube 15 is a sealable hatch 16 which can be opened to remove or insert a wafer 17 or other object into the isolation tube 15, and appropriate inert or reactive gases may be introduced into the isolation tube 15 through port 8 during processing of the wafer 17.

The pyrometer assemblies 10 and 12 include infrared detectors 6, optical-path slits 11 positioned to geometrically limit the radiation that strikes the detector 6, and radiation pass-band-filters 18 that limit the band of infrared radiation that strikes the detectors. These detectors 6 may include thermopiles, each including a plurality of thermo couples, that respond to the incident radiation to produce representative electrical signals in known manner. The detectors 6 are thus disposed to respond to radiation within the band and within the immediate field of view or "view area" through the apertures or slits 11 in the housing 20.

One of the pyrometer assemblies 10 is positioned to sense radiation that passes through the optical window 22 in the isolation tube 15. Typically, this window is made of quartz of about 0.15 mm thickness. The second pyrometer assembly 12 is positioned to sense radiation from the isolation tube 15 at a different location with no optical window in its field of view.

Figure 3:
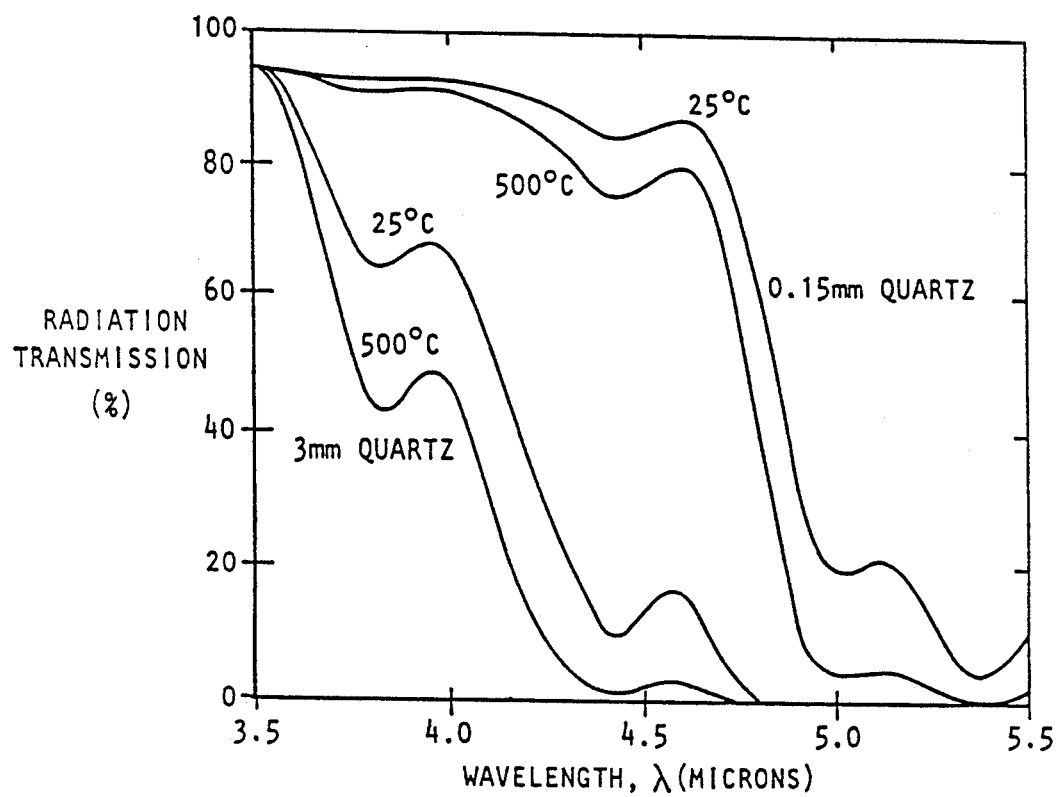
FIG. 3 is a graph illustrating the transmission characteristics of quartz at two different thicknesses and temperatures as a function of the radiation wavelength.

One of the principles of the present invention may be understood from an analysis of the transmission characteristics of the isolation tube material which allow differentiation between the radiation signals incident upon the two pyrometer assemblies 10 and 12. Typical transmission characteristics of the isolation tube and optical window 22 are illustrated in the graph of FIG. 3 for the isolation tube made of 3 mm quartz and the window made of 0.15 mm quartz. It can be seen that 3 mm quartz effectively attenuates radiation having wavelengths greater than 4.3 microns, whereas 0.15 mm quartz (in the optical window 22) has an equivalent attenuation only for wavelengths greater than 4.9 microns. It can be seen from FIG. 3 that these different radiation transmissions for quartz occur within a limited waveband that is not wider than about 1.0 microns. For sapphire windows, the transmissivity as a function of wavelength of the transmitted radiation over substantially the same temperature range remains higher than for quartz out to longer wavelengths (not shown). By choosing band pass filters 18 that pass radiation between 4.3 and 4.7 microns, the first pyrometer assembly 10 senses radiation from the hot wafer that passes through the optical window 22 as well as radiation from the chamber environment, including the lamps 14 and the hot quartz of the isolation tube 15. The second pyrometer assembly 12 located in alignment with the hot wafer thus senses mainly radiation from the chamber environment, including the lamps 14 and the hot quartz of the isolation tube 15.

Figure 4:
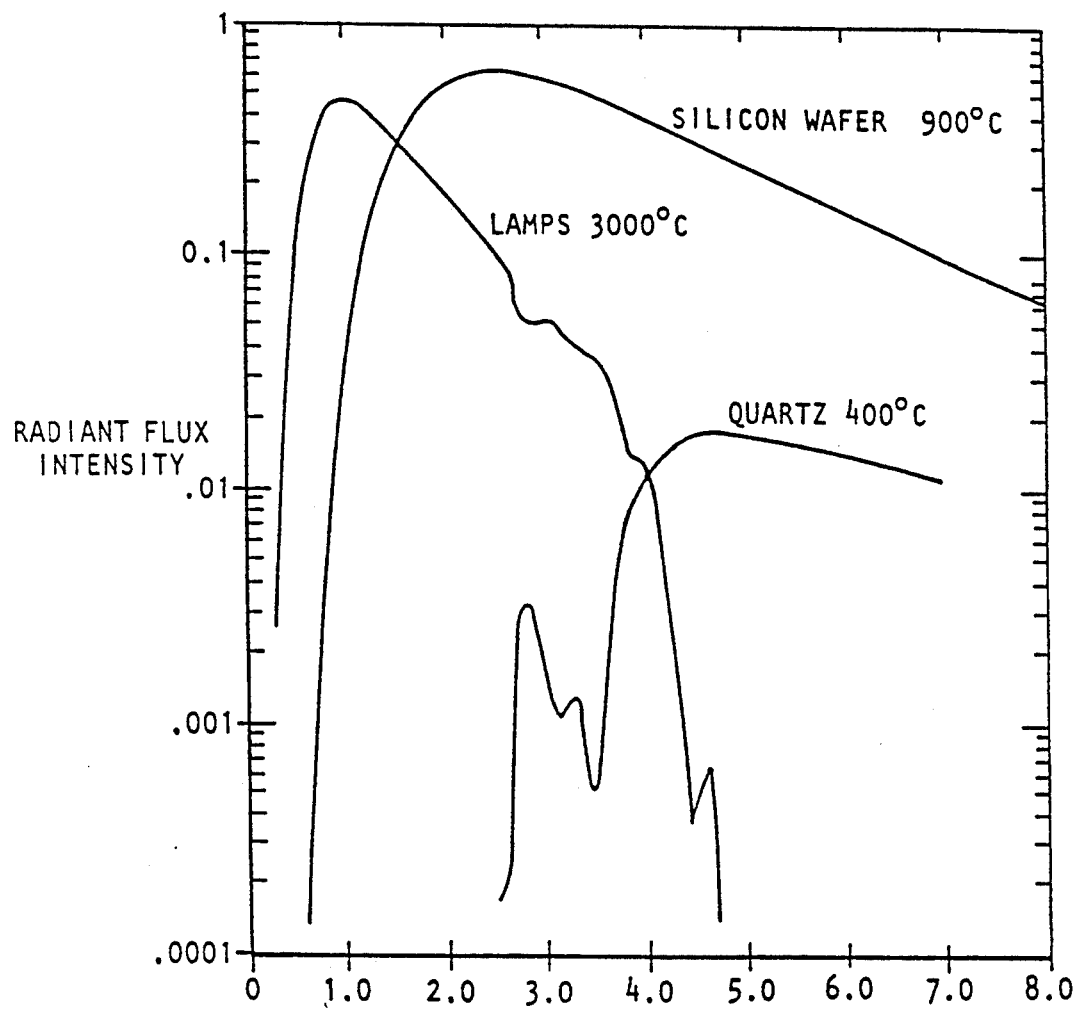
FIG. 4 is a graph illustrating representative radiation intensities and wavebands from three different emitting elements in an implementation of the preferred embodiment, namely, the tungsten-halogen lamps, a silicon wafer, and the quartz chamber.

FIG. 4 is a graph illustrating representative radiation intensities and wavebands from three different emitting elements, namely, the tungsten-halogen lamps, a silicon wafer, and the quartz chamber, and illustrates typical spectral energy fluxes that are incident on the pyrometer assembly 10 below the window 22 from these three main sources of radiation. In this illustrated embodiment of the present invention, those main sources of radiation include the tungsten filaments of the tungsten-halogen lamps 14 at about 3000° C., the silicon wafer 17 at about 900° C., and the quartz isolation tube 15 at about 400° C. It should be noted that the quartz does not radiate significantly except at radiation wavelengths at which it becomes relatively opaque (at about 2.7 microns and (above about 3.5 microns), and that the quartz radiation does not come solely from the window area. It should also be noted that at radiation wavelengths for which the quartz isolation tube 15 becomes opaque, a considerable amount of the lamp radiation is blocked by the quartz of the isolation tube 15.

Referring again to FIG. 3, quartz is shown as transmitting radiation at wavelengths less than 4.0 microns through two different thicknesses, namely, 0.15 millimeters and 3.0 millimeters. Since the waveband of radiation from tungsten-halogen lamps 14 peaks predominantly at an approximate wavelength of about 1.0 microns at the operating temperature of about 3000° C., the quartz of the isolation tube 15 readily transmits the radiant energy from the lamps to the wafer 17 which then heats up.

As indicated in FIG. 4, the radiated waveband of lamp energy that arrives at the pyrometer assemblies is predominantly at wavelengths less than about 4.0 microns. Thus, the filters 18 associated with the pyrometer assemblies 10 and 12 essentially eliminate responsiveness of the detectors 6 to radiation from the lamps 14 and enhance the responsiveness thereof to radiation from the silicon wafer at the various temperatures thereof.

The combination of 4.3 to 4.7 micron band-pass filters 18 and the window 22 in the quartz isolation tube 15 enables the two pyrometer assemblies 10 and 12 to respond to radiation from distinctive, composite sources, i.e. to the radiation from the chamber environment alone and to the radiation from the chamber environment and wafer combined. Therefore, the radiation emitted by the wafer 17 alone can now be isolated to provide an accurate indication of its true temperature within the hot chamber environment.

Figure 5:
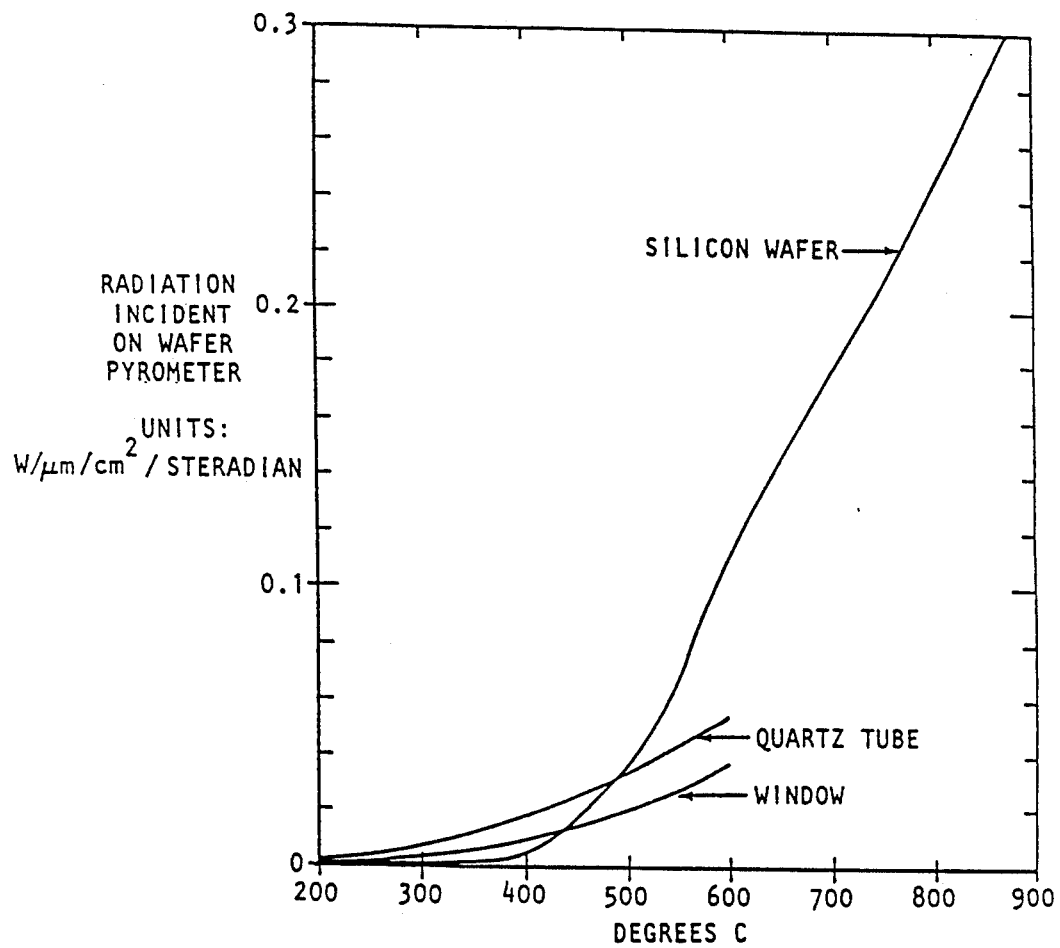
FIG. 5 is a graph illustrating the radiant energy incident upon a pyrometer assembly at about 4.5 microns wavelength as a function of the temperature of radiating elements.

FIG. 5 indicates the temperature dependence of the radiation fluxes on the pyrometer assembly 10 from three main sources of radiation in the 4.3 to 4.7 micron wave band in one embodiment of the invention.

Figure 2:
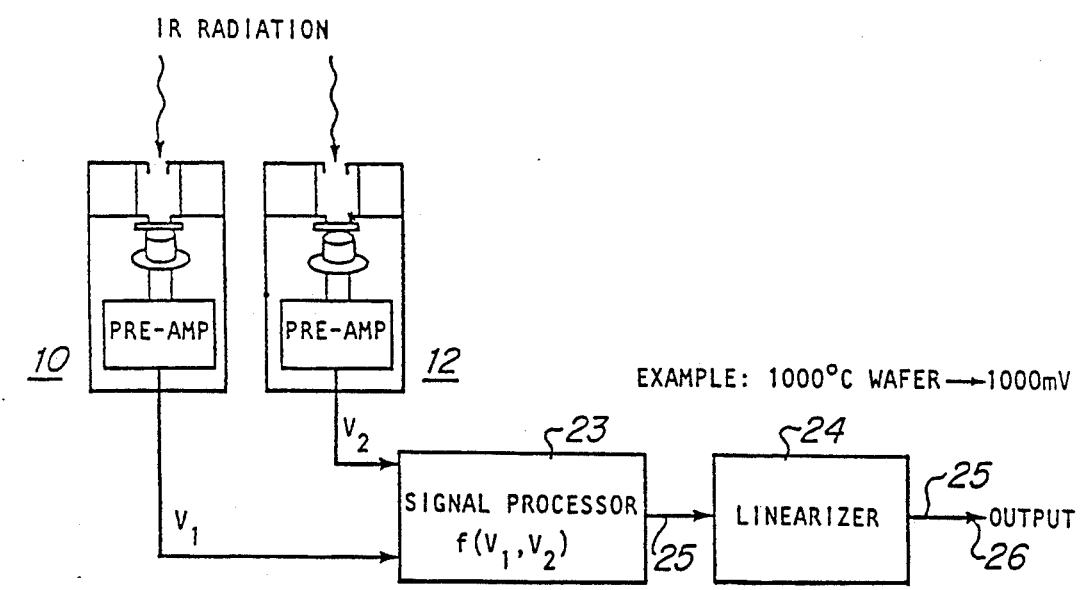
FIG. 2 is a pictorial schematic diagram of the operating circuitry of the present invention.

Referring now to FIG. 2, the output signals generated by the pyrometer assemblies 10 and 12 are applied to electronic signal processing circuitry that produces an output voltage which is a true indication of the radiation from the object. In the present embodiment, this signal processing circuitry includes a differential amplifier 23 the output of which is applied to a linearizer circuit 24. The signal processor 23 may include a differential amplifier which subtracts a selected multiple, A, of the voltage $V_2$ generated by pyrometer assembly 12 from the voltage $V_1$ generated by pyrometer assembly 10, to provide a voltage 25 indicative of the true temperature of the wafer 17 alone. The linearizer circuit 24 includes conventional circuitry which produces an output signal 26 that is linearly proportional to the true wafer temperature.

Figure 6A:
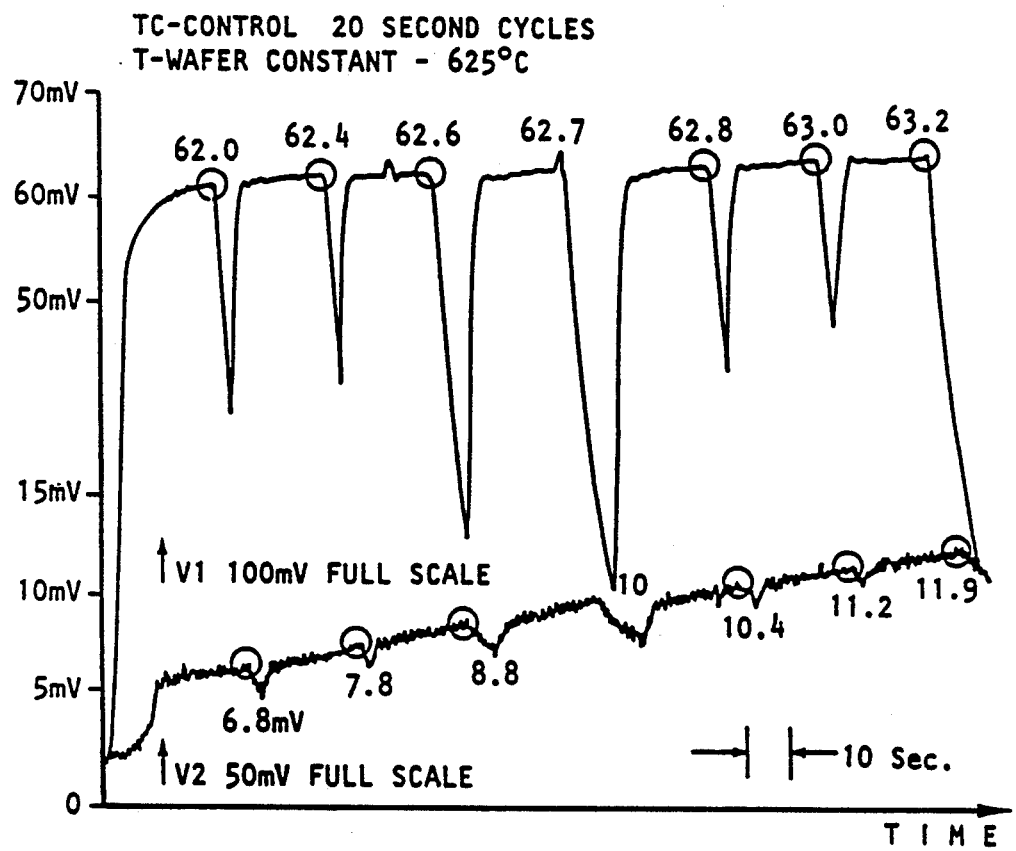
FIGS. 6(*a*) and (*b*) are graphs of output signal levels from the two detectors of the present invention.
Figure 6B:
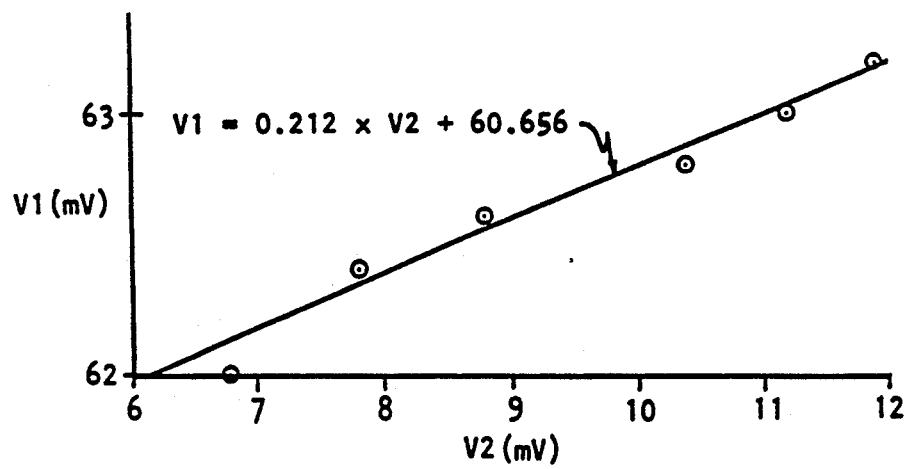

The multiple, A, may be determined experimentally, for example as illustrated in the graphs of FIG. 6(a) and (b), from the functional correlation of the incremental variation of $V_1$ from pyrometer assembly 10 with $V_2$ from the pyrometer assembly 12 as the isolation tube 15 and wafer 17 are heated up in successive heating cycles over time. In addition, the emissivity of the wafer 17 may vary with the diverse surface coatings on the wafer. Thus, the multiple, A, depends upon the surface characteristics of the particular wafer 17 and upon the temperatures of the wafer 17 and isolation tube 15 through which the heating process takes place. The multiple, A, may thus be determined by characterizing the portion or percentage variations in the signal $V_1$, attributable to variations in the signal $V_2$, as illustrated in FIG. 6(b):

$$V_1 = A * V_2 + B$$

In one embodiment of the invention for a sample wafer 17 of given surface properties operating at about 625° C. (as measured accurately by contact thermometry apparatus of conventional design, A is determined to be approximately 21%. The signal processor 23 thus produces an output signal 25 representative of the temperature of the wafer 17 with a certain radiation emissivity. The correlation between this output signal (optically determined) and the true wafer temperature may thus be determined in accordance with one embodiment using a sample wafer 17 mounted in close thermal contact with a thermally-responsive element such as a thermocouple that is calibrated in actual temperature. One such correlation technique is described, for example, in the aforementioned Related Application. The correlation between actual wafer temperature and the optically measured temperature of the wafer 17 can then be used for thereafter optically measuring the temperature of the rest of a population of wafers having identical surface characteristics in a given batch of wafers as each is inserted into the isolation tube 15. The linearizer 24 may include a conventional analog shaping circuit (or a digitizer and lookup table of values determined by such preliminary calibration procedures) to convert voltages at the inputs of the signal processor 23 into corresponding, direct temperature outputs 26 or readings. Such linearization may be employed to overcome the non-linear levels of radiation from the wafer as a function of temperature, for example, as shown in FIG. 5.

Therefore, the apparatus and method of the present invention for optically measuring the temperature of a remote object within a hot environment operates within selected wavebands on substantially the ambient radiation alone and on the composite ambient radiation and radiation from the remote object to provide a direct indication of the temperature of the remote object. Changes in emissivity of the remote object may be taken into account by correlating the radiant temperature reading of a sample object with true, contact temperature readings of the object, and the true temperature of all identical objects in a batch may thereafter be optically measured accurately.

What is claimed is:

1. A method for sensing the temperature of a remote object that is heated within a chamber by a source of radiation that is supplied to the object from outside the chamber which includes a boundary wall having a window therein where the boundary wall and window include quartz, the method comprising the steps of:

supplying radiation within a first waveband from the source through the quartz of the boundary wall of the chamber to the object therewithin; and sensing radiation from the remote object within the chamber through the quartz of the window within a limited waveband relative to the first waveband for which the quartz of the window exhibits a different transmissivity than the transmissivity of the quartz of the boundary wall to radiation within the first waveband for providing from the sensed radiation an output indication of the temperature of the remote object.

2. The method according to claim 1 wherein the limited waveband is not wider than approximately 1 micron.

* * * * *